United States Patent Office 3,394,150
Patented July 23, 1968

3,394,150
POLYNITRATES OF STEROIDAL ALCOHOLS
Gerhard R. Wendt, Havertown, Pa., assignor to American Home Products Corporation, New York, N.Y., a corporation of Delaware
No Drawing. Filed June 23, 1966, Ser. No. 559,741
10 Claims. (Cl. 260—397.2)

ABSTRACT OF THE DISCLOSURE

This invention is concerned with polynitrates of cholane, coprostane, androstane and cholestane which may be prepared by treating the corresponding alcohols with a mixture of fuming nitric acid and acetic anhydride. The products have exhibited utility as vasodilators, lowering the arterial pressure by the dilation of the blood vessels.

---

This invention relates to new and useful polynitrates of steroidal alcohols having pharmacological activity.

The novel compounds within the purview of the present invention are represented by the following structural formula:

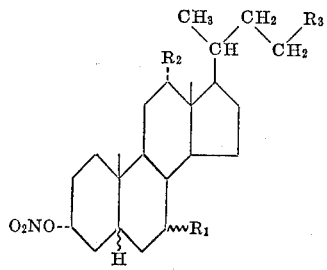

wherein $R_1$ and $R_2$ are selected from the group consisting of hydrogen and nitrato; $R_3$ is selected from the group consisting of lower alkyl; nitrato(lower)alkyl; 1,2-dinitratoethyl; 3-nitrato-2-(nitratomethyl) propyl and 1,3-dinitrato-2-(nitratomethyl)propyl; and (⌇) indicates that the substituent is in the alpha or beta position. Examples of such compounds include 5β-cholane-3α,7α,12α,24-tetrol tetranitrate; 5β-cholane-3α,24-diol dinitrate; 5β-coprostane-3α,7α,12α-triol trinitrate; and 5α-cholestane-3α,7α,12α,26,27-pentol pentanitrate.

The novel polynitrates of the present invention may be prepared by the reaction of an appropriate steroidal alcohol with a nitric acid-acetic anhydride mixture at temperatures below 0° C. When the reaction is complete, the excess acid is neutralized by the addition of an alkaline reagent such as the hydroxide, carbonate or bicarbonate of an alkali metal or alkaline earth metal salt. The resulting polynitrated steroid is then separated and purified by conventional methods, such as, extraction and crystallization.

Many of the steroidal alcohols employed as reactants in the above reaction are known compounds which are available from commercial sources, while the remainder can be prepared by procedures well known to those skilled in the chemical art.

In accord with the present invention, the new polynitrated steroids herein described have been found to possess interesting pharmaceutical properties which render them useful as synthetic medicinals. More particularly, these nitrates, in standard pharmacological tests, have exhibited utility as vasodilators, lowering the arterial pressure by the dilation of the blood vessels.

When the polynitrated steroids of this invention are employed as vasodilators, they may be administered alone or in combination with pharmaceutically acceptable carriers, the proportion of which is determined by the solubility and chemical nature of the compound, chosen route of administration and standard pharmaceutical practice. For example, they may be administered orally in the form of tablets or capsules containing such excipients as starch, milk sugar, certain types of clay and so forth. They may be administered sublingually in the form of troches or lozenges in which the active ingredient is mixed with sugar and corn syrups, flavoring agents and dyes; and then dehydrated sufficiently to make it suitable for pressing into a solid form. They may be administered orally in the form of solutions which may contain coloring and flavoring agents or they may be injected parenterally, that is intramuscularly, intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects and preferably at a level that is in the range of from about 0.1 mg. to about 10 mg. per kg. of body weight per day, although as aforementioned variations will occur. However, a dosage level that is in the range of from about 0.5 mg. to about 8 mg. per kg. of body weight per day is most desirably employed in order to achieve effective results.

The following examples are given by way of illustration and are not to be construed as limitations of this invention, many variations of which are possible without departing from the scope and spirit thereof.

Example I

To a stirred solution of 19.2 ml. of fuming nitric acid (sp. gr.=1.5) and 58 ml. of acetic anhydride at $-40°$ C., there is added 2.0 g. of 5β-cholane-3α,7α,12α,24-tetrol. The reaction mixture is then gradually brought to 20°C., poured into ice water, neutralized with sodium bicarbonate and extracted with nitromethane-chloroform. The combined extracts are washed with 10% sodium bicarbonate and concentrated to about 20 ml., yielding 5β-cholane-3α,7α,12α,24-tetrol tetranitrate (1.0 g., 34% yield, M.P. 192–193° C.).

$\lambda_{max}^{KBr}$ 6.14, and 7.63μ

*Analysis.*—For $C_{24}H_{38}N_4O_{12}$ Calc'd: C, 50.17; H, 6.67; N, 9.75. Found: C, 50.37; H, 6.73; N, 9.58.

Example II

To a stirred solution of 9.5 ml. of fuming nitric acid (sp. gr.=1.5) and 30 ml. of acetic anhydride at $-50°$ C., there is added 1.0 g. of 5β-cholane-3α,24-diol. Subsequently, the reaction mixture is gradually brought to room temperature and poured into ice water, neutralized with potassium bicarbonate and extracted with nitromethane-chloroform. The combined extracts are washed with 10% sodium carbonate and concentrated to about 10 ml., the resulting precipitate is 5β-cholane-3α,24-diol dinitrate.

Example III

A stirring solution of 57.6 ml. of fuming nitric acid and 174 ml. of acetic anhydride at −10° C. are added to 6.0 g. of 5β-cholane-3α,12α,24-triol. Thereafter, the reaction mixture is gradually brought to 25° C. and poured into ice water, neutralized with sodium hydroxide and extracted with ether. The combined extracts are washed with 10% potassium bicarbonate and concentrated to about 60 ml., the resulting precipitate which is separated by filtration is 5β-cholane-3α,12α,24-triol trinitrate.

Example IV

To a stirred solution of 19.2 ml. of fuming nitric acid (sp. gr.=1.5) and 58 ml. of acetic anhydride at −40° C., there is added 2.0 g. of 5β-coprostane-3α,7α,12α-triol. The reaction mixture is then gradually brought to 20° C., poured into ice water, neutralized with sodium bicarbonate and extracted with nitromethane-chloroform. The combined extracts are washed with 10% sodium bicarbonate and concentrated to about 20 ml., the precipitated product is separated by filtration and is 5β-coprostane-3α,7α,12α-triol trinitrate.

In a similar manner, the following steroidal alcohols are reacted with nitric acid to produce their corresponding trinitrates:

| Starting Material | Product |
|---|---|
| 17β-(1-methylpentyl)-5β-androstane-3α,7α,12α-triol. | 17β-(1-methylpentyl)-5β-androstane-3α,7α,12α-triol trinitrate. |
| 17β-(1-methylbutyl)-5β-androstane-3α,7α,12α-triol. | 17β-(1-methylbutyl)-5β-androstane-3α,7α,12α-triol trinitrate. |
| 17β-(1-methyloctyl)-5β-androstane-3α,7α,12α-triol. | 17β-(1-methyloctyl)-5β-androstane-3α,7α,12α-triol trinitrate. |
| 17β-(1-methylnonyl)-5β-androstane-3α,7α,12α-triol. | 17β-(1-methylnonyl)-5β-androstane-3α,7α,12α-triol trinitrate. |

Example V

To a stirring solution of 19.2 ml. of fuming nitric acid and 58 ml. of acetic anhydride at −40° C., there is added 2.0 g. of 27-nor-5β-cholestane-3α,7α,12α,26-tetrol. The reaction mixture is then gradually brought to 20° C., poured into ice water, neutralized with sodium bicarbonate and extracted with nitromethane-chloroform. The combined extracts are washed with 10% sodium bicarbonate and concentrated to about 20 ml., yielding 27-nor-5β-cholestane-3α,7α,12α,26-tetrol tetranitrate.

Similarly, 17β - (5-hydroxy-1-methylpentyl)-5β-androstane-3α,7α,12α-triol is nitrated to obtain 17β-(5-hydroxy-1-methylpentyl) - 5β - androstane-3α,7α,12α-triol tetranitrate.

Example VI

A stirring solution of 9.5 ml. of fuming nitric acid and 30 ml. of acetic anhydride at −60° C. is added to 1.0 g. of 24-hydroxymethyl-5β-cholane-3α,7α,12α,24-tetrol. The reaction mixture is then gradually brought to room temperature and poured into ice water, neutralized with potassium hydroxide and extracted with nitromethane-chloroform. The combined extracts are washed with 10% sodium bicarbonate and concentrated to about 10 ml., the resulting precipitate is separated by filtration and is 24-hydroxymethyl-5β-cholane-3α,7α,12α,24-tetrol pentanitrate.

Example VII

To a stirred solution of 19.2 ml. of fuming nitric acid (sp. gr.=1.5) and 58 ml. of acetic anhydride at 0° C., there is added 2.0 g. of 5α-cholestane-3α,7α,12α,26,27-pentol. The reaction mixture is gradually brought to room temperature and poured into ice water, neutralized with sodium bicarbonate and extracted with nitromethane-chloroform. The combined extracts are washed with 5% sodium bicarbonate and concentrated to about 20 ml., yielding 5α-cholestane-3α,7α,12α,26,27-pentol pentanitrate.

Example VIII

5β-coprostane-3α,7α,12α,24,26,27-hexol (10.0 g.) is added with stirring to a mixture of fuming nitric acid (96 ml.) and acetic anhydride (290 ml.) at −60° C. When the reaction is complete, the reaction mixture is brought to 20° C., poured into ice water, neutralized with potassium hydroxide and extracted with nitromethane-chloroform. The combined extracts are washed with 15% potassium bicarbonate and concentrated to about 100 ml. The resulting precipitate is separated by filtration and is 5β-coprostane-3α,7α,12α,24,26,27-hexol hexanitrate.

What is claimed is:

1. A compound selected from the group consisting of those having the formula:

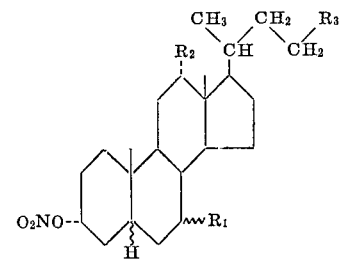

wherein $R_1$ and $R_2$ are selected from the group consisting of hydrogen and nitrato; and $R_3$ is selected from the group consisting of lower alkyl, nitrato(lower)alkyl, 1,2-dinitratoethyl, 3-nitrato-2-(nitratomethyl)propyl and 1,3-dinitrato-2-(nitratomethyl)propyl.

2. A compound as described in claim 1 which is: 5β-cholane-3α,7α,12α,24-tetrol tetranitrate.

3. A compound as described in claim 1 which is: 5β-cholane-3α,24-diol dinitrate.

4. A compound as described in claim 1 which is: 5β-cholane-3α,12α,24-triol trinitrate.

5. A compound as described in claim 1 which is: 5β-coprostane-3α,7α,12α-triol trinitrate.

6. A compound as described in claim 1 which is: 24-hydroxymethyl - 5β - cholane-3α,7α,12α,24-tetrol pentanitrate.

7. A compound as described in claim 1 which is: 5α-cholestane-3α,7α,12α,26,27-pentol pentanitrate.

8. A compound as described in claim 1 which is: 5β-coprostane-3α,7α,12α,24,26,27-hexol hexanitrate.

9. A compound as described in claim 1 which is: 27-nor-5β-cholestane-3α,7α,12α,26-tetrol tetranitrate.

10. A compound as described in claim 1 which is: 17β-(5 - hydroxy - 1-methylpentyl)5β-androstane-3α,7α,12α-triol tetranitrate.

No references cited.

ELBERT ROBERTS, *Primary Examiner.*